3,019,853
SEPARATION OF GASES BY DIFFUSION
Girard T. Kohman and Kenneth B. McAfee, Jr., Summit,
N.J., assignors to Bell Telephone Laboratories, Incorporated, New York, N.Y., a corporation of New York
Filed June 30, 1958, Ser. No. 745,374
11 Claims. (Cl. 183—2)

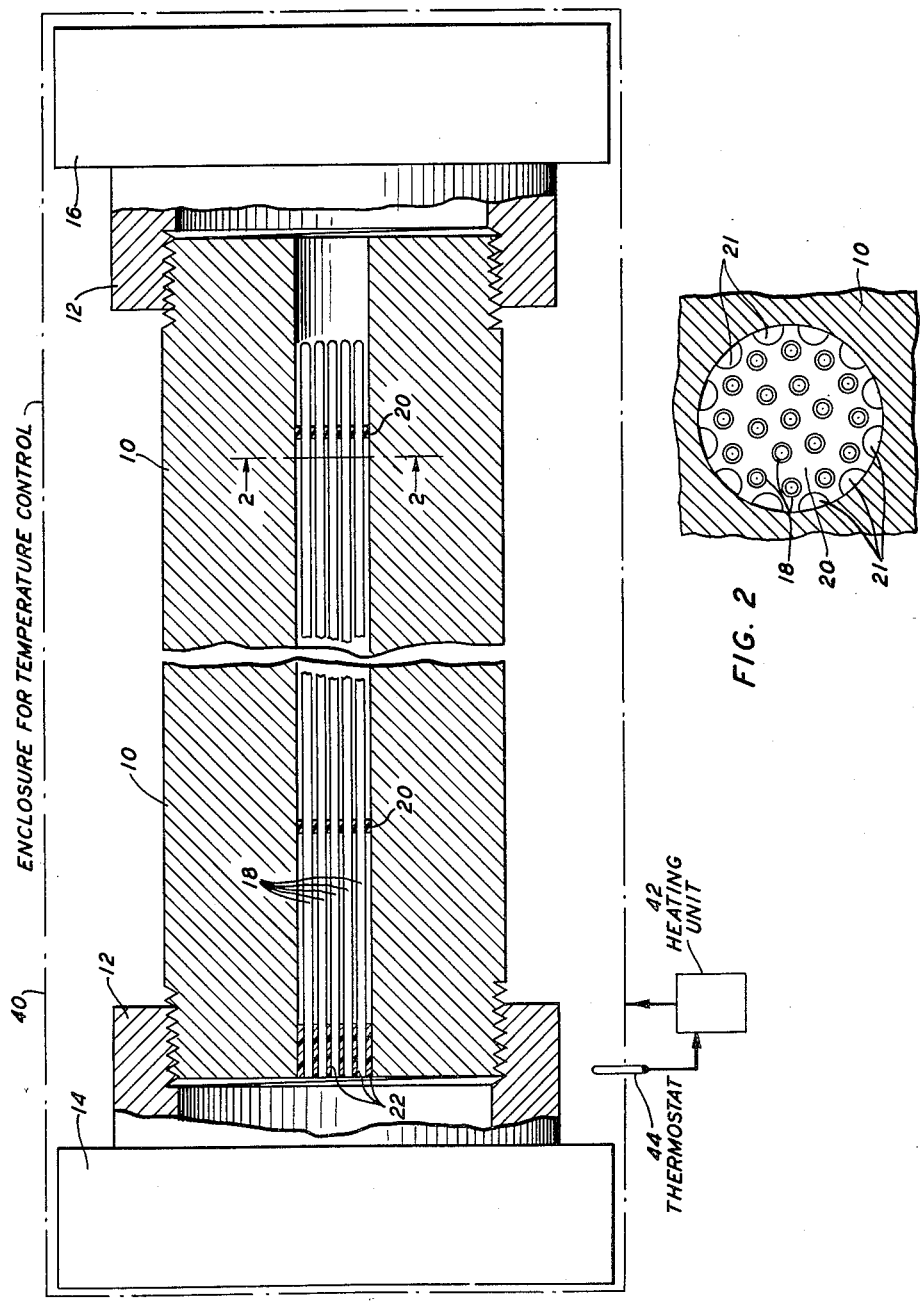

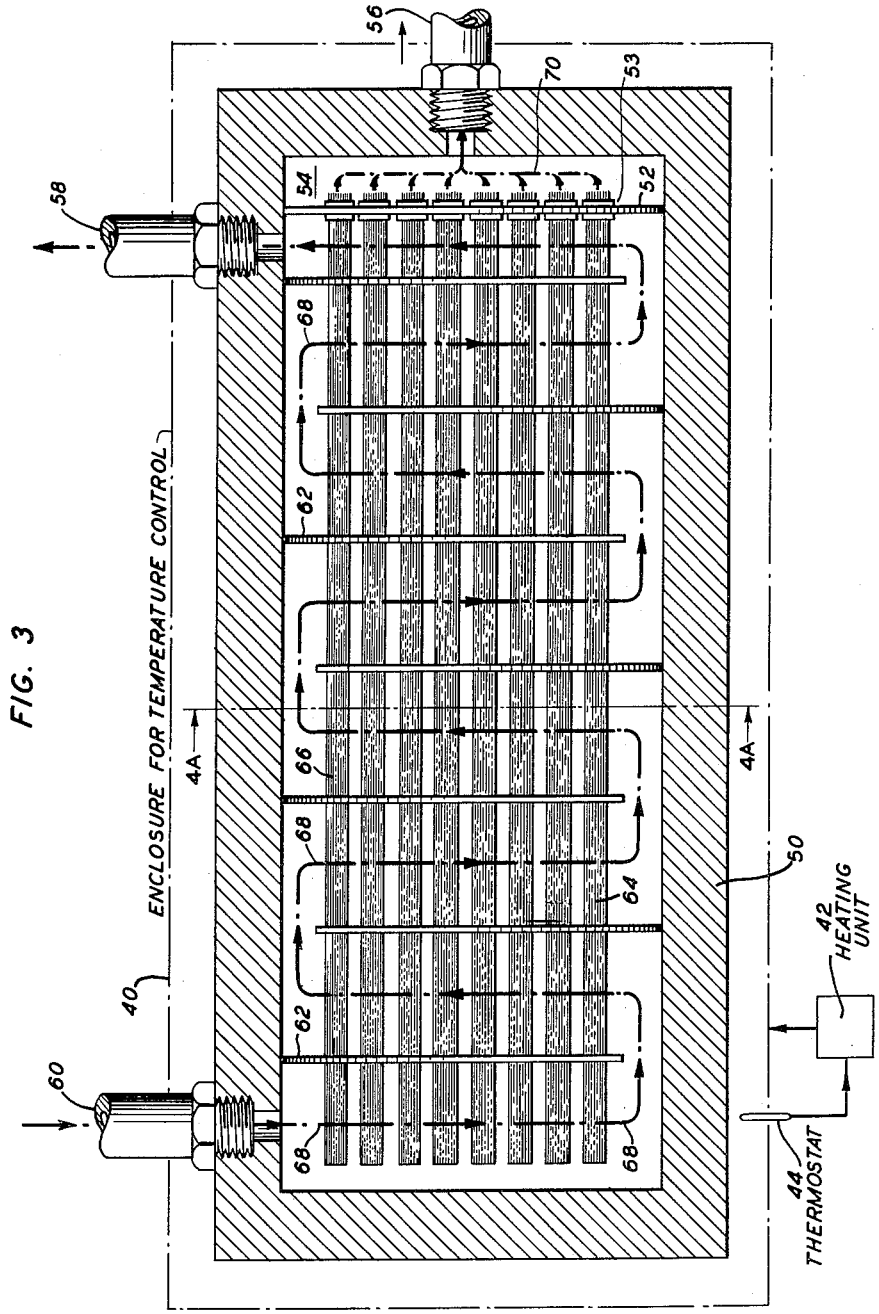

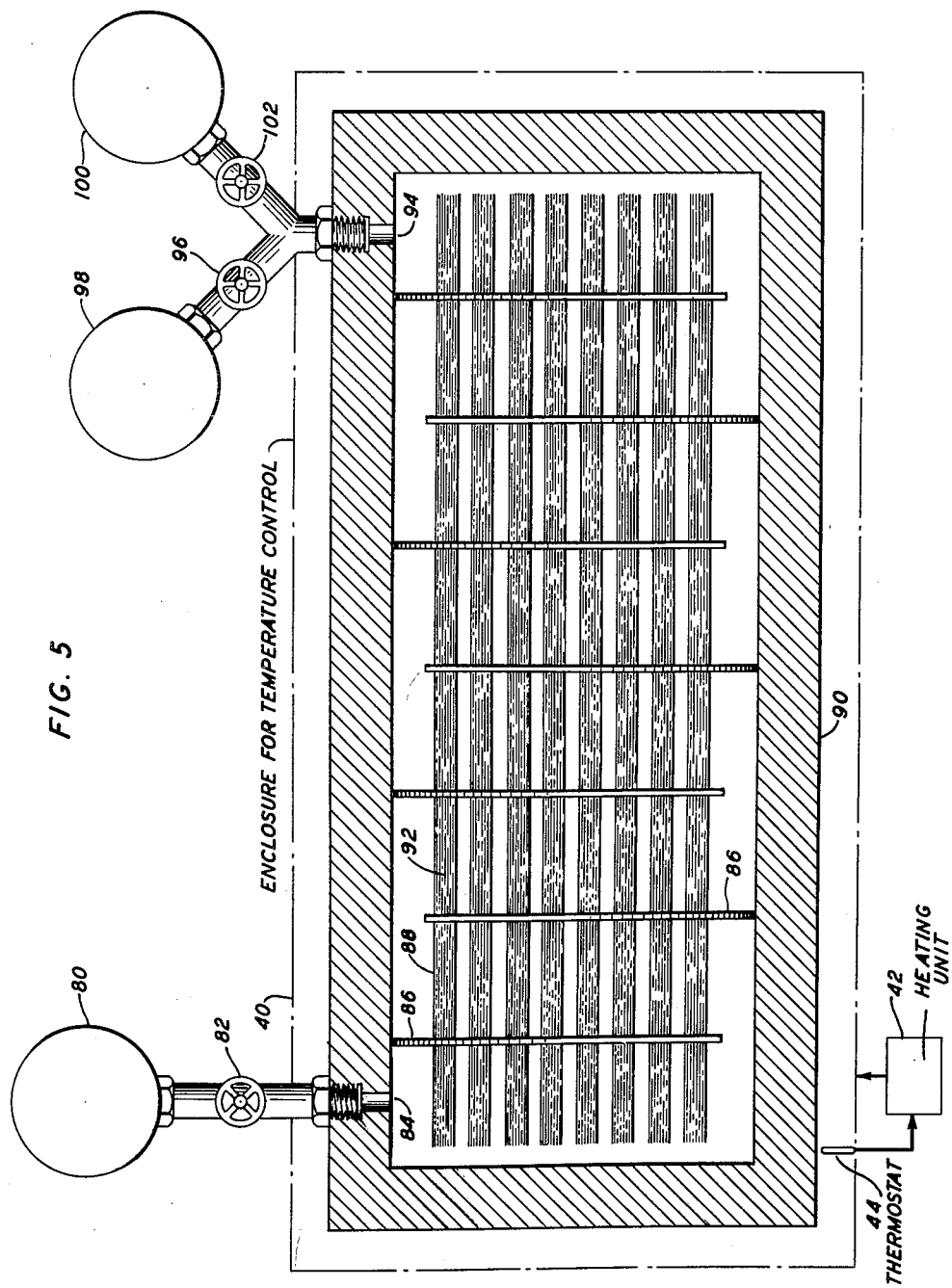

This invention relates to methods and apparatus for the separation of gases.

This application is a continuation-in-part of applicants' joint copending application, Serial No. 654,881, filed April 24, 1957, now abandoned.

At the present time, only a very limited number of installations capable of producing relatively pure helium in commercially significant quantities are known to exist. These installations employ a low temperature distillation process which requires a very considerable investment in plant, machinery, and apparatus. They, further, are expensive to operate and consequently are not economically practicable in many situations.

The only known substantial sources of helium are "natural gas" deposits, which have usually been discovered during the drilling of oil wells. These deposits are located in specific geographical areas of the United States. The gas from such deposits or wells, though referred to as "helium rich," frequently contains only from one to two percent of helium. Some deposits have been found which contain from three to seven percent helium and in rare instances as much as ten percent helium. At the present time only about a tenth of the helium present in the natural gas being consumed annually is being recovered. The choice of a suitable location for the presently used distillation type of helium recovery plant, because of its cost and the heavy equipment required, involves serious economic hazards since the continued availability of a sufficient source of natural gas having ample helium content to justify operation of the plant is usually not subject to positive prediction.

It is estimated that at least three billion cubic feet of helium per year are being permitted to escape into the atmosphere as a result of the use of natural gas as fuel without first recovering the helium. This represents a most serious waste of a vital national resource.

During the last decade the demand for helium has increased enormously and is still rapidly increasing. The presently available supply for important commercial purposes is already inadequate and in the absence of the development of a greatly augmented supply and more economical methods of recovering even small percentages of helium, will soon become grossly insufficient for the country's minimum essential needs.

A further important commercial problem at the present time is the purification of neon gas to eliminate trace amounts (i.e. fractional parts of one percent) of helium. This results from the fact that present commercial processes for isolating neon from gas mixtures leave a fractional percent or trace of helium. It is highly desirable that convenient economical means for removing these trace amounts of helium be devised.

Accordingly, it is a principal object of the invention to facilitate the recovery of helium from mixtures of helium with other gases.

Another principal object is to simplify the processes and apparatus required and to thus reduce the cost of recovering helium from mixtures of helium with other gases.

A further principal object is to facilitate the continuous processing of gas from a source of natural gas to extract the helium.

A still further object is to facilitate the separation of specific gases from a mixture of gases.

A further specific object is to facilitate the elimination of traces of helium from otherwise pure neon.

These and other objects are realized in accordance with the present invention by novel methods and apparatus devised and arranged to efficiently and effectively utilize the unique property of silica type and borosilicate type glasses and a number of other glasses which have such a precise distribution of interstitial regions in their respective atomic lattice structures that a few tenths of an angstrom increase in the effective diameter of the atom or molecule of a gas passing by "activated diffusion" (see definition hereinunder) through the glass will result in as much as a thousandfold or even a millionfold reduction in the permeability of the glass to the gas.

For the purposes of the present application and the appended claims the terms "silica type glass" and "borosilicate glasses" shall be understood to include all glasses having at least 75 percent by weight of silica, the borosilicate glasses having in addition between 2 and 15 percent $B_2O_3$.

"Activated diffusion" is to be carefully distinguished from mere "porous flow" and as well from the progression through a barrier by chemical reaction with the barrier material.

For the silica type and borosilicate type glasses and for any glass containing at least an aggregate of 75 percent of one or more of the glass forming substances $SiO_2$, $B_2O_3$, $Al_2O_3$ and $P_2O_3$, there are no "pores" extending through even the thinnest barrier of such glass, if free from defects as noted hereinunder. Thus in the passage of helium atoms through these glasses and in the passage of hydrogen molecules (at temperatures in excess of several hundred degrees centigrade) through these glasses, the individual atoms progress step by step by finding a succession of vacant spaces within the lattice structure of the material. There is no pushing of the leading atoms or molecules by those following, as occurs for porous flow, and there is no chemical reaction taking place as required for progression through the barrier by successive chemical reactions.

While it was known for many years prior to the construction of the distillation type helium recovery plants that various gases will under appropriate circumstances pass through various types of glass, the rate at which this phenomenon, known as "activated diffusion," has heretofore been observed to take place has been extremely small. Even careful analysis by highly skilled scientists has resulted in the positive opinion that it could not be utilized in extracting helium from "natural gas" in sufficient volume to be of any practical interest. Furthermore, when filtering helium from "natural gas" by "activated diffusion" through glass was first proposed by applicants, it was objected that even if the process could be sufficiently accelerated the helium bearing natural gases would soon coat the glass surfaces with deposits from the hydrocarbons comprising a principal component of the natural gases and such deposits would effectively prevent the helium from permeating the glass. Experimental installations in successful operation have, however, experienced no difficulty from this source.

By employing a very large number of very small diameter elongated cylinders or "capillary tubes" having very thin walls, applicants have been able to realize a structure having a large aggregate area of very thin glass membrane which will readily withstand high pressure differences between the opposite sides of the thin glass walls and will pass by "activated diffusion" large aggregate quantities of specific gases, particularly helium, per hour.

Fortunately, the above-mentioned distribution of interstitial regions in the lattice structures of silica type glass and borosilicate type glass and a number of other glasses is such that at room temperature and up to temperatures of about 300 degrees centrigrade the helium atom is the only gas atom or molecule which is sufficiently small to pass in appreciable quantity through the glass. The latter, therefore, provide a very convenient and efficient filtering medium for separating practically pure helium from a mixture of gases impressed on one side of a membrane or thin barrier of the glass. At temperatures from 500 to 800, or more, degrees centigrade the lattice structures of these glasses apparently open up slightly since at these temperatures the slightly larger hydrogen molecule, approximately 25 percent larger than the helium atom, will also permeate by "activated diffusion" through the glass in significant quantities. However, since the great majority of "natural gas" deposits contain substantially no free hydrogen, and since at the higher temperatures helium permeates the glass by "activated diffusion" at a rate many hundred times faster than at room temperature, it is advantageous in separating helium from natural gas to operate the glass filtering membranes at the highest temperature at which the mechanical strength of the thin glass walls is still sufficient to withstand the respective pressure differentials of the magnitudes best suited for the various methods of the invention.

Applicants were also confronted immediately by the problem of devising adequate sealing means at the entrance of the tubes into the pressure chamber to withstand high pressure differences without damage to the extremely fragile glass capillary tubes. Tough resin seals have been developed which solve this problem satisfactorily.

By an alternate method and arrangement of the invention, the necessity for the use of such a seal is completely eliminated. In this method a plurality of evacuated closed glass tubes or vessels are subjected to the mixture of gases from which the helium is to be extracted under pressure in a pressure chamber until they become filled with helium. The mixture is then withdrawn and the helium within the tubes is permitted to diffuse back into the pressure chamber whence it is drawn off and stored. Thus the tubes act as a sort of sponge, absorbing helium in the presence of the helium-rich mixture and yielding it up again after the mixture has been removed.

The methods and arrangements of the invention, illustrative forms of which are described in detail hereinafter, make entirely feasible the economical recovery of substantially all of the immense aggregate volume of helium at present being released into the atmosphere.

The above and further objects, features and advantages of the invention will become readily apparent during the course of the following detailed description of specific illustrative arrangements and processes of the invention taken in conjunction with the accompanying drawings in which:

FIG. 1 illustrates a simple arrangement for practicing the principles of the invention;

FIG. 2 is a partial transverse cross-sectional view at plane 2—2 of the arrangement of FIG. 1;

FIG. 3 illustrates the essential features of a more complex unit employing the principles of the invention;

FIG. 5 illustrates the essential features of another arrangement employing the principles of the invention.

Figure 4A:
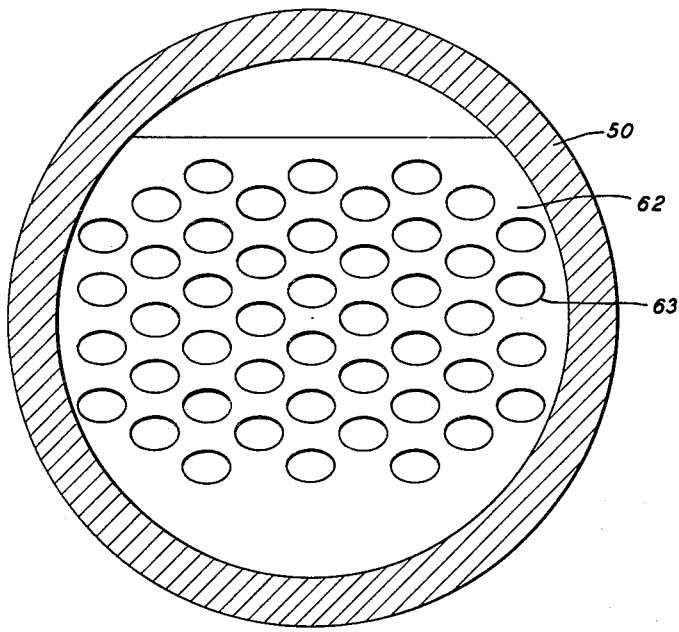
FIG. 4A is a transverse cross-sectional view of the arrangement of FIG. 3 at plane 4A—4A.

In more detail in FIG. 1, a steel alloy compression chamber 10 is illustrated in longitudinal cross-sectional view, to an enlarged scale, and comprises a thick circular cylindrical tube of a tough alloy steel, such as that known to those skilled in the art by the trade name "Ketos." This is a crucible alloy steel containing a plurality of fractional percentages of alloying materials such as carbon, manganese, silicon, chromium and tungsten and is well known to those skilled in the art. The essential properties for the purposes of the present invention are that it be sufficiently strong to withstand internal pressures in the order of several thousand atmospheres and that it retain its strength at elevated temperatures, for example, temperatures within the range of 100 to 800 degrees centigrade. Several of the so-called "stainless" steels, the characteristics and properties of which are well known and understood by those skilled in the art, have also been found satisfactory for use in fabricating pressure chambers for practicing the invention and perform well at the high pressures and high temperatures mentioned above.

In the specific embodiment illustrated in FIG. 1, cylindrical tube 10 may have, by way of example, an inner diameter of .70 inch and an outer diameter of 1.5 inches.

Assembled within steel tube 10 are a plurality of long tubes of glass (at least two dozen can be accommodated).

Substantially all glasses will pass some helium by "activated diffusion" but it is preferable to use a glass which includes at least a total aggregate of 75 percent of one or more of the "glass-forming" substances $SiO_2$, $B_2O_3$, $Al_2O_3$ and $P_2O_3$. Glasses comprising at least 75 percent of silica and glasses comprising at least 75 percent of silica and up to 15% of $B_2O_3$ are among the better glasses for the purposes of the invention, specific, suitable, commercially-marketed glasses being, for example, fused silica (100 percent silica), chemical Pyrex glass (81% $SiO_2$; 13% $B_2O_3$; 2% $Al_2O_3$ and 4% $Na_2O$ and/or $K_2O$) and Vycor (96% $SiO_2$; 3% $B_2O_3$ and 1% $Al_2O_3$). In general, borosilicate glasses containing at least 75% of silica are also satisfactory for the purposes of the invention.

The glass tubes of FIG. 1 may have, by way of specific example, internal diameters of 20 mils and external diameters of 26 mils, the wall thickness of the tubes accordingly being 3 mils.

As will be discussed in more detail hereinunder, much "thinner-walled" glass tubes can be employed provided tubes of smaller diameters are used. Also, it is feasible to use thicker-walled tubes having appropriately larger inner diameters as will also be further described hereinunder.

The right ends of tubes 18 are closed, as shown. The left ends of tubes 18 are open and are supported at the left end of steel tube 10, as shown, by being embedded in a mass 22 of a tough sealing compound such as that known to those skilled in the art as epoxy resin. The compound 22 is preferably reinforced or strengthened by thoroughly mixing through it approximately 5 percent of very fine silica particles such as silica fibers or silica powder. At intervals in the order of 2 feet along the tubes 18, spiders 20 are positioned to assist in supporting the tubes. Spiders 20 may be of metal, glass or ceramic and should have a plurality of holes having a loose sliding fit over the tubes 18, the pattern of holes in the spider 20 conforming, of course, to the arrangement of the tubes 18 within the pressure chamber 10, as shown more clearly in FIG. 2. FIG. 2 also shows a plurality of cut-out portions 21 on the periphery of spider 20 which permit free passage of gas past the spider. FIG. 2 is a partial transverse cross-sectional view at plane 2—2 of FIG. 1 and is, obviously, to a somewhat larger scale than FIG. 1.

Returning to FIG. 1, couplings 12, at each end of steel compression chamber 10 make connection at the left end to unit 14 and at the right end to unit 16, respectively. To simplify the drawing, the walls of the couplings have been shown thinner than the walls of the compression chamber 10. Since at least one of them must withstand the full pressure applied to the pressure chamber, they should obviously be of sufficient strength to do so.

In one method of operating the arrangement illustrated in FIG. 1, unit 16 comprises a source of a mixture of gases, such as "natural gas" including a small percentage of helium such as 2 percent, by way of specific example, and means for subjecting said mixture to a pressure which preferably is at least several thousand pounds per square inch and may be as great as 2000 atmospheres, or more, and maintaining the pressure throughout periods in which the apparatus is being operated to extract the helium. Unit 16 should, of course, include control means for injecting a charge of the helium bearing gas mixture into the compression chamber under the desired pressure and additional means for withdrawing the charge of gas after the helium has been removed, before the next charge of helium-rich gas is introduced into the pressure chamber. Any of numerous and varied arrangements for performing these functions well known to those skilled in the art can be employed to carry out the desired cycle of operations just described. Appreciable amounts of helium will pass by "activated diffusion" through the glass tubes even at atmospheric pressure but the rate is substantially increased with increasing pressure. Unit 16 should, of course, include one of the numerous and varied arrangements well known and extensively used by those skilled in the art to maintain gas at the required pressure, such arrangements conventionally including an appropriate supply of the gas mixture, a suitable compressor, a storage tank, and pressure regulating means to maintain the required pressure in the tank.

The mixture of gases at a pressure between several thousand pounds per square inch and 2000 atmospheres or more, for example, is permitted to flow into compression chamber 10 through coupling 12 at the right and surround the glass tubes 18 in chamber 10.

Though the thickness of the walls of tubes 18 is, for example, only 3 mils, it has been found by applicants that, if the tubes are made of sufficiently small diameter (in the specific example being described this diameter is 26 mils outside or 20 mils inside), the tubes will not be crushed under compression by pressures of 2000 or more atmospheres. In some instances such small glass tubes have successfully withstood externally applied pressures of nearly 10,000 atmospheres. The ratio of inner diameter to wall thickness for tubes of approximately 20 mils inner diameter should be not greater than about 7 for tubes of silica type glass, i.e., glass containing at least 75 percent of silica. The wall thickness should be, within limits indicated below, as thin as manufacturing considerations and the characteristics of the particular glass being employed permit. The glass must be free from pinholes, bubbles, rib lines, inclusions of foreign material, and thin spots. To the present time, glass tubes having walls about 1 micron thick and internal diameters of about 16 microns have been manufactured successfully. However, for the purposes of the present invention it is believed that silica type or borosilicate type glass tubes having a wall thickness of between 1 to 5 mils and an internal diameter of from 4 to 7 times the wall thickness are better adapted to meet the various and sundry requirements and conditions for operation in accordance with the principles of the present invention. The smaller of these tubes are preferably supported on wire mesh trays rather than by spiders, as will be illustrated in FIGS. 3 and 5 and described hereinafter.

Contrary to calculations based upon published data on glass, tubes having diameters as small as 250 mils (i.e. one-quarter inch) and wall thicknesses of 30 mils were found to fail at pressures of about 10,000 pounds per square inch by developing visually observable cracks. Tests indicate that the abnormal strength of small glass tubes, as disclosed in this application, does not begin to appear until an outer diameter not exceeding about 100 mils or less is used. For tubes of about this diameter (100 mils) the ratio of inner diameter to wall thickness should be about 4 or 5 to 1. It is believed that the abnormal strength effect is related to that observed for very fine glass fibers where tensile strengths exceeding that of the strongest steel have been obtained. Thicker glass fibers or members, or course, do not approach the strength of even ordinary steels.

As has long been known in the art, helium will slowly diffuse by "activated diffusion" through silica type, borosilicate type and other glasses at normal room temperatures while hydrogen and heavier gases will not to any appreciable degree. Furthermore, the rate of "activated diffusion" of the helium through the glass is substantially directly proportional to the pressure of the gas upon the glass. Of course, if the arrangement employed places the glass wall or barrier under a tension exceeding 50 percent of its breaking tensile strength the rate is augmented as taught in the copending application Serial No. 653,471, filed April 17, 1957, jointly by applicants and W. P. Mason. This application matured as Patent 2,892,508, granted June 30, 1959.

The methods and arrangements of the invention permitting the use of extremely high pressures as described above, to be impressed upon very large numbers of very thin walled glass tubes therefore make possible a greatly increased rate of "activated diffusion," resulting in a very substantial increase in the volume of helium per unit time which can be extracted by "activated diffusion" from a mixture of helium with other gases.

At temperatures in the order of 500 to 800 degrees centigrade and using tubes of silica type or borosilicate type glass, it is entirely practicable with the arrangement of FIG. 1 to effect the separation of hydrogen from mixtures of the isotopes such as hydrogen, deuterium and tritium, the hydrogen diffusing through the silica type glass at these temperatures and the other gases remaining in the high pressure area.

For operation at higher temperatures, either to increase the rate of the separation of helium from natural gas or to separate hydrogen from its isotopes, the over-all arrangement as shown in FIG. 1 is enclosed by enclosure 40. Heating unit 42 establishes the desired temperature within enclosure 40 and maintains its temperature under control of thermostat 44. Any of numerous and varied arrangements well known and extensively used by those skilled in the art may be used to establish and maintain the desired temperature. It should be particularly noted that it is the temperature of the diffusing barrier, that is, the glass tubes, which should be raised to and maintained at the operating temperature during the process of extracting the helium or hydrogen. Accordingly, the apparatus should be heated for a sufficient time prior to starting the diffusion process to insure that the tubes shall have reached the desired temperature. Obviously, the use of a heated gas mixture can supplement or even completely assume the major function of heating unit 42 and heat may further be recovered from the gas withdrawn from the pressure chamber after extraction of the helium or hydrogen, the recovered heat being employed to assist in heating the next charge of gas to be processed. Many such heat-exchange arrangements are well known and extensively used by those skilled in the art.

Of course, the larger the total area of glass through which diffusion can take place the larger the volume of extracted or purified gas per unit time which can be obtained.

While arrangements approximating the specific type illustrated in FIG. 1 have proven eminently satisfactory during appreciable periods of successful experimental operation, for recovering virtually pure helium from natural gas for experimental uses, where a dozen or so liters per day of helium are ample, applicants have devised other arrangements to be described in detail hereinunder capable of recovering far greater quantities.

The coupling 12 of FIG. 1 at the left end of the compression chamber 10 serves to connect the open left ends of the tubes 18 to unit 14 which is a storage tank preferably equipped with an exhaust pump and compressor to draw the gas diffusing through tubes 18 out of the tubes and store it under a convenient pressure in a storage tank of unit 14. Many and various forms of such arrangements being well known and extensively used in the art, it is not deemed necessary to illustrate or describe them in detail in the present application.

As an alternative arrangement, the compression chamber 10 with the tubes 18 mounted therein as described in detail above may be turned end to end so that the mixture of gases under pressure from unit 16 is introduced into the interiors of tubes 18 and then diffusion through the tubes 18 will take place in the opposite direction, i.e., into the space surrounding the tubes in chamber 10 from which space it will be drawn and stored in the storage tank of unit 14 substantially as described above for the first described arrangement. Alternatively, units 14 and 16 can of course be interchanged.

For internally impressed pressures, the tubes 18 will withstand only a fraction of the pressure they will withstand when it is exerted on their outer surfaces. By way of specific example, the tubes of an arrangement substantially as illustrated in FIG. 1 have been operated at an internal pressure of approximately 1000 atmospheres with entirely satisfactory results.

As taught in applicants' above-mentioned copending joint application with W. P. Mason, if the internal pressure is sufficient to subject the tubes 18 to tensile stress in excess of 50 percent of, but less than, their breaking tensile stress, the rate of "activated diffusion" will be appreciably increased particularly as the stress approaches more closely to the breaking tensile stress of the material. Because of this, a somewhat lower pressure impressed within the tubes 18 may still result in a greater diffusing rate than that resulting from the use of a much higher pressure on the exterior of the tubes.

For both methods of operating the arrangement of FIG. 1, however, it it necessary to inject a charge of the gas mixture and after a period sufficient for substantially all of the helium to diffuse through the glass tubes it is necessary to withdraw the charge and inject a new charge of the mixture including helium. The process is therefore obviously intermittent in character and less suitable, by way of example, for large scale extraction of helium from a large flow of natural gas. Accordingly, an arrangement providing for large scale continuous or uninterrupted operation will be described hereinbelow.

In the above-described arrangements and further arrangements to be described presently for separating helium from "natural gas" or other gas mixtures including helium, a single filtering operation will normally result in complete separation of the helium from the other gases. As taught in applicants' above-mentioned joint application with W. P. Mason, however, for other mixtures of gases it may be necessary to pass the mixture through the apparatus several times in succession before an acceptably complete separation has been effected. Where this is to be done on a large scale, a plurality of units of the invention can be employed in tandem as taught in the joint application with W. P. Mason.

Figure 4B:
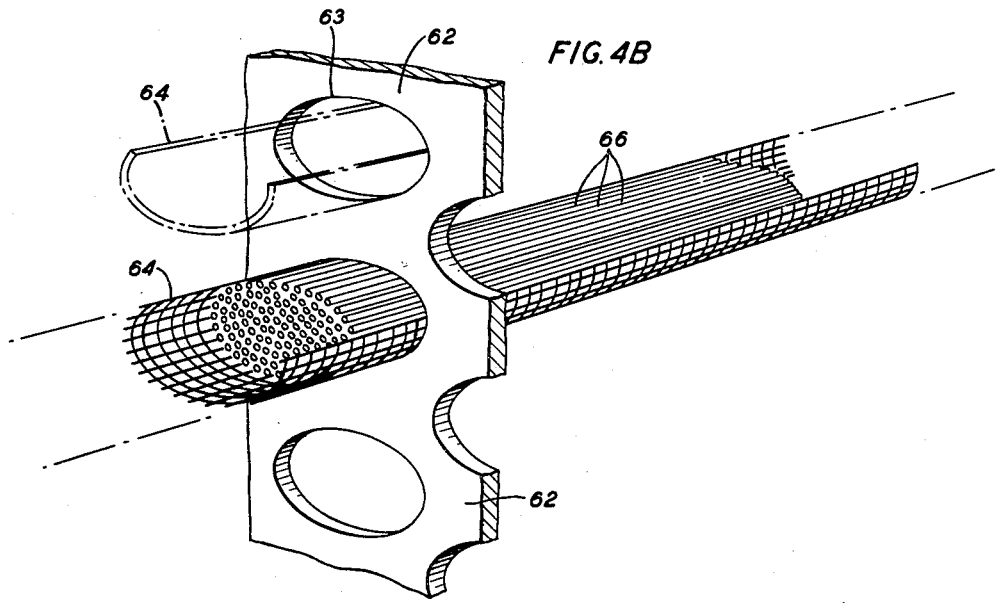
FIG. 4B is an enlarged showing of a fragment of a baffle plate and a portion of a tray of capillary tubes as used in FIG. 3.

In FIG. 3 an arrangement of the invention adapted to process a large volume and a continuous flow of a "helium rich" mixture of gases to extract the helium is shown. In FIG. 3 a compression chamber 50 has assembled therein a plurality of 46 wire mesh trays 64 each holding a large number, for example, 1000, capillary tubes 66 of a silica type or borosilicate type glass, details of the arrangement of the tray and tubes being illustrated in a fragmentary view, to an enlarged scale, in FIG. 4B. Wire mesh trays are preferably employed to permit the gas mixture to more readily reach the surfaces of the tubes 66. The trays 64 holding the tubes 66 are supported by being passed through baffle plates 62, as is also shown to an enlarged scale in the fragmentary view of FIG. 4B. Baffle plates 62 leave spaces, from left to right in FIG. 3, alternately at the bottom and top of tank 50 as indicated in FIG. 3 and the cross-sectional view of FIG. 4A, taken at plane 4A—4A of FIG. 3, so that a mixture of helium-rich gas injected into input pipe 60 substantially follows the path traced by the broken line 68 and associated arrows to emerge from outlet pipe 58 near the opposite end of the tank 50, as shown.

The 46 wire mesh trays 64, each holding its plurality of capillary tubes, substantially fill the holes 63 (FIGS. 4A and 4B) in the baffle plates 62 so that only a negligible amount of leakage of the gas mixture occurs through these holes.

The tubes 66 are all closed at their left ends and open at their right ends, a portion near the right ends of each trayfull of tubes being embedded in a resin seal 53 (similar to seal 22 of FIG. 1) in partition 52 so that the insides of the tubes are all connected to space 54 at the right end of tank 50. The seals 53 and partition 52 are arranged to exclude the mixture of gases injected at inlet 60 from entering space 54, but, of course, helium passing into tubes 66 passes freely from the open ends of the tubes to space 54 whence it is withdrawn through outlet pipe 56 and pumped into a suitable storage tank (not shown).

The pressure of the mixture of gases is maintained at an appropriate amount preferably between several thousand pounds per square inch and 2000 atmospheres or more, and the rate of flow of the gas mixture from input pipe 60 to output pipe 58 is regulated so that gas leaving by outlet pipe 58 has practically no helium remaining in it. Alternatively, for very large scale operation several assemblies per FIG. 3 may be connected in series and the rate of flow adjusted so that the gas mixture leaving the outlet of the last assembly will be substantially free of helium.

Enclosure 40 and heating unit 42 controlled by thermostat 44 permit maintaining the entire assembly including the glass tubes 66 at a suitable temperature for the process being carried on. For example, if helium is being separated from a natural gas containing no free hydrogen, the glass tubes are preferably maintained at between 300 and 600 degrees centigrade.

If substantial amounts of free hydrogen are present in the gas mixture and it is not desired to have it separated out with the helium, then the glass tubes should preferably be maintained at a temperature between 100 and 300 degrees centigrade though an appreciable volume of helium will pass through the tubes even at ordinary room temperatures.

As discussed in detail hereinabove, the glass tubes are preferably of a silica type or a borosilicate type glass containing at least 75 percent of silica, though substantially all glasses will pass some helium by "activated diffusion."

Tube sizes can vary between inner diameters of 100 mils to 16 microns with wall thicknesses between 20 mils and one micron, respectively, and ratios of inner diameters to wall thickness of four or five for the largest diameter tubes to ten or more for the smallest diameter tubes. It has been found entirely practicable to draw any of the preferred glasses for the purposes of the present invention to any size and wall thickness within the ranges indicated above and to substantially any length desired.

For the arrangement of FIG. 3 employed to extract the helium from natural gas, the tubes should preferably have a wall thickness of between 1 and 5 mils and a ratio of inner diameter to wall thickness of between 3 and 7. The output of helium from a continuous flow of natural gas containing 2 percent of helium for an arrangement of the type illustrated by FIG. 3 having tubes 10 feet long operating at approximately 500 degrees centigrade with a pressure of the gas mixture of from several thousand pounds per square inch to 2000 atmospheres or more can be expected to be on the order of several thousand cubic feet per hour, the exact amount depending of course on the cumulative effect of all factors entering into the design and affecting the operating conditions.

Obviously, if it is desired to inject a continuous flow of the mixture of gases into the interiors of the tubes of an arrangement substantially as illustrated in FIG. 3 the left ends of all tubes should be connected through resin seals to a second compartment at the left end of the tank (substantially as is done in FIG. 3 at the right end) and the helium then will pass by "activated diffusion" through the tubes into the central section of the tank whence it can be removed for storage.

In FIG. 5 an alternative arrangement of the invention is shown which differs from that of FIG. 3 principally in that the tubes 88 within the trays 92 are closed at both ends and are wholly within the central section of the pressure tank 90, no separated end compartments being required in this arrangement.

In the arrangement of FIG. 5, helium-rich natural gas from a pressurized source 80 is admitted through intake pipe 84 by opening valve 82 to tank 90 and passes alternately under and over the consecutive baffles 86 to outlet pipe 94 where with valve 96 open and valve 102 closed it can pass to storage reservoir 98. The helium passes through and into the tubes 88 filling them, whereupon valve 82 is closed and an exhaust pump (not shown) included in storage reservoir 98 withdraws the natural gas remaining in tank 90. Valve 96 is then closed and valve 102 is opened, and an exhaust pump (not shown) included in storage unit 100 withdraws the helium diffusing out of tubes 88 until substantially all of the helium is extracted from the tubes 88. Tubes 88 are thus analogous to a "sponge" alternately absorbing and giving off helium. As for the arrangement of FIG. 3, in FIG. 5 temperature control enclosure 40, heating unit 42, and thermostatic control unit 44 are preferably provided to maintain the tubes at an appropriate temperature for the rate of extraction desired for the process being carried out. Suitable timing and execution of the several steps in the process can of course be carried out by any of numerous conventional automatic control systems not shown but well known and extensively used by those skilled in the art to automatically control cyclically operating combinations of mechanisms.

The arrangement of FIG. 5 is well adapted for removing trace quantities (a fraction of 1 percent) of helium from nearly pure neon. A considerable quantity of such neon can "lose" its helium to the "sponge" tubes before they become filled with helium and require evacuation of the helium from the tubes as described above.

Numerous and varied methods and arrangements and variations of the same within the spirit and scope of the principles of the present invention will readily occur to those skilled in the art. No attempt to exhaustively illustrate all possible such variations has here been made.

What is claimed is:

1. The method of extracting helium from a mixture with other gases comprising impressing the mixture under a pressure of several thousand pounds per square inch upon the outer surfaces of a plurality of capillary tubes formed of a glass including at least one of the glass-forming substances selected from the group consisting of $SiO_2$, $B_2O_3$, $Al_2O_3$ and $P_2O_3$ to an aggregate percentage of at least 75 percent and recovering the helium which passes from the mixture into the tubes.

2. The method of extracting helium from a mixture with other gases comprising impressing the mixture under a pressure of several thousand pounds per square inch upon the outer surfaces of a plurality of capillary tubes formed of a glass including at least one of the glass-forming substances selected from the group consisting of $SiO_2$, $B_2O_3$, $Al_2O_3$ and $P_2O_3$ to an aggregate percentage of at least 75 percent, maintaining the tubes at a temperature between 100 and 800 degrees centigrade and recovering the helium which passes from the mixture into the tubes.

3. The method of extracting helium from a mixture with other gases comprising establishing a pressure differential of several thousand pounds per square inch between the internal and external pressures of a plurality of capillary tubes formed of a glass having a silica content of at least 75 percent by impressing the mixture of gases on the outside of the tubes and recovering helium which passes through the tubes.

4. Apparatus for separating helium from a mixture of helium and hydrogen, said apparatus including a tube of chemical Pyrex glass, said tube having a wall thickness between 2 and 5 mils and an internal diameter not exceeding seven times said wall thickness, a first gas-tight enclosure enclosing an area substantially surrounding said tube, a second gas-tight enclosure freely communicating with the interior of said tube, gas-tight means sealing the interior of said tube from the area enclosed by said first enclosure, means for injecting said mixture of gases under a pressure of a thousand atmospheres into said first enclosure, and means for collecting and storing the helium which passes to the other of said enclosures by diffusion through the wall of said tube.

5. Apparatus for separating helium from a mixture of helium and hydrogen, said apparatus including a tube of chemical Pyrex glass, said tube having a wall thickness between 2 and 5 mils and an internal diameter not exceeding seven times said wall thickness, a first gas-tight enclosure enclosing an area substantially surrounding said tube, a second gas-tight enclosure freely communicating with the interior of said tube, gas-tight means sealing the interior of said tube from the area enclosed by said first enclosure, means for injecting said mixture of gases into said first enclosure at a pressure between 2000 atmospheres and 10,000 atmospheres, and means for collecting and storing the helium which passes to the said second enclosure by diffusion through the wall of said tube.

6. Apparatus for separating and purifying gases comprising in combination a tube of chemical Pyrex glass, the wall thickness of said tube being between 2 and 5 mils, the inner diameter of said tube being not greater than seven times the wall thickness, a first gas-tight enclosure enclosing an area substantially surrounding said tube, a second gas-tight enclosure freely communicating with the interior of said tube, gas-tight means sealing the interior of said tube from the area enclosed by said first enclosure, a source of a mixture of gases, said gases having substantially differing rates of diffusion through the material of said tube, means for injecting said mixture of gases into said first enclosure under a pressure of substantially 1000 atmospheres and means for collecting gas from the other of said enclosures.

7. Apparatus adapted to continuously extract helium from a source of natural gas comprising a first compartment adapted to withstand several thousand atmospheres pressure, a second compartment having a common wall with the first compartment, a plurality of glass capillary tubes closed at one end and open at the other, the open ends of the tubes extending through pressure seals in the common wall into the second compartment, the remaining portions of each of the tubes being enclosed within the first compartment, an intake port at one end of the first compartment, an outlet port at the other end of the first compartment, a plurality of baffle plates within the first compartment to direct the flow of gas from intake to outlet ports alternately transversely and longitudinally with respect to the tubes along the entire length of the tubes, whereby a continuous flow of natural gas under pressure can be injected into the intake port and removed from the outlet port and helium removed from said natural gas by the passage thereof through the walls of said glass capillary tubes can be removed from the second compartment.

8. The apparatus of claim 7, the capillary tubes each being of a glass including at least 75 percent of silica, having a wall thickness between 1 and 5 mils and an internal diameter between four and seven times the wall thickness.

9. The apparatus of claim 8 and means for maintaining the glass capillary tubes at a temperature between 100 and 800 degrees centigrade.

10. The method of extracting helium from a mixture with other gases by progression through the atomic lattice of vitrified, non-porous glass which comprises impressing the mixture of gases under high pressure of at least several thousand pounds per square inch upon the outer surfaces of a plurality of capillary, vitrified, non-porous glass tubes formed of a glass having a silica content of at least 75 percent while maintaining the temperature of the glass tubes at an elevated temperature, the thickness of the glass tubes being such that it will pass the helium under the high pressure by progression through the atomic lattice of the glass at a commercially acceptable rate and the ratio of the diameter of the tubes to the thickness of the glass of the tubes being sufficiently small so that the tubes will withstand the external pressure to which they are subjected, and removing from the tubes the helium which passes into the interior thereof.

11. Apparatus for extracting helium from a mixture with other gases comprising a plurality of capillary, vitrified, non-porous glass tubes formed of a glass including at least one of the glass-forming substances selected from the group consisting of $SiO_2$, $B_2O_3$, $Al_2O_3$ and $P_2O_5$ to an aggregate percentage of at least 75 percent, means for impressing the mixture of gases under high pressure of at least several thousand pounds per square inch upon the outer surfaces of the glass tubes, means for controlling the temperature of the glass tubes, the thickness of the glass tubes being such that it will pass the helium under the high pressure by progression through the atomic lattice of the glass at a commercially acceptable rate and the ratio of the diameter of the tubes to the thicknesss of the glass of the tubes being sufficiently small so that the tubes will withstand the pressure to which they are subjected, and means for removing helium which passes into the interior of the tubes.

References Cited in the file of this patent

UNITED STATES PATENTS

| | | |
|---|---|---|
| 2,225,184 | Osenberg | Sept. 9, 1941 |
| 2,407,559 | Krotz | Sept. 10, 1946 |
| 2,540,151 | Weller et al. | Feb. 6, 1951 |
| 2,734,592 | Jones | Feb. 14, 1956 |
| 2,892,508 | Kohman et al. | June 30, 1959 |